United States Patent
Blickle

(10) Patent No.: US 12,088,178 B2
(45) Date of Patent: Sep. 10, 2024

(54) CONVEYOR HAVING AN ELECTRIC MOTOR

(71) Applicant: SEW-EURODRIVE GMBH & CO. KG, Bruchsal (DE)

(72) Inventor: Rainer Blickle, Lyman, SC (US)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 318 days.

(21) Appl. No.: 17/626,172

(22) PCT Filed: Jun. 29, 2020

(86) PCT No.: PCT/EP2020/025305
§ 371 (c)(1),
(2) Date: Jan. 11, 2022

(87) PCT Pub. No.: WO2021/004656
PCT Pub. Date: Jan. 14, 2021

(65) Prior Publication Data
US 2022/0320952 A1 Oct. 6, 2022

Related U.S. Application Data

(60) Provisional application No. 62/872,931, filed on Jul. 11, 2019.

(30) Foreign Application Priority Data
Jul. 22, 2019 (DE) .......................... 102019005068.1

(51) Int. Cl.
*H02K 7/00* (2006.01)
*B65G 23/22* (2006.01)
(Continued)

(52) U.S. Cl.
CPC ............. *H02K 7/003* (2013.01); *B65G 23/22* (2013.01); *H02K 1/12* (2013.01); *H02K 1/22* (2013.01); *H02K 5/04* (2013.01)

(58) Field of Classification Search
None
See application file for complete search history.

(56) References Cited

U.S. PATENT DOCUMENTS 3,918,574 A * 11/1975 Allison .................. B65G 23/36
 318/113
7,537,107 B2 * 5/2009 Hall ....................... B65G 13/07
 198/781.03

(Continued)

FOREIGN PATENT DOCUMENTS

CN 2452826 Y 10/2001
CN 201713737 U 1/2011
(Continued)

OTHER PUBLICATIONS

International Search Report issued in corresponding International Application No. PCT/EP2020/025305 dated Oct. 12, 2020, pp. 1-2, English Translation.

(Continued)

*Primary Examiner* — Bernard Rojas
(74) *Attorney, Agent, or Firm* — Carter, DeLuca & Farrell LLP

(57) ABSTRACT

A conveyor includes an electric motor having a stator housing and a rotor connected in a torsionally fixed manner to a rotatable hollow shaft. The hollow shaft is connected in a torsionally fixed manner to a solid shaft, which projects at least partly into a recess of the hollow shaft. The stator housing with the bearing flange connected to the stator housing is connected to a flange, which is connected to a second support part on the side facing away from the electric motor. The solid shaft projects through a recess of the second (Continued)

support part and is rotatably mounted in a first bearing accommodated in a first support part, and the solid shaft is connected in a torsionally fixed manner to a conveyor device. means. The conveyor device is situated between the first and the second support part, and the flange is connected to the second support part with the aid of screw parts projecting through recesses of the flange. Each screw part is set apart from the flange and the respective screw part projects through a spring part that is situated between the respective screw part and the flange.

23 Claims, 3 Drawing Sheets

(51) Int. Cl.
    *H02K 1/12*          (2006.01)
    *H02K 1/22*          (2006.01)
    *H02K 5/04*          (2006.01)

(56) References Cited

U.S. PATENT DOCUMENTS

| | | |
|---|---|---|
| 9,573,765 B2 | 2/2017 | Becker |
| 11,518,617 B2 * | 12/2022 | Damaska ............. B65G 21/105 |
| 2004/0035684 A1 | 2/2004 | Fukuoka |
| 2017/0207683 A1 * | 7/2017 | Anghel .................... H02P 9/00 |
| 2017/0267459 A1 | 9/2017 | Ramezani |
| 2019/0393758 A1 * | 12/2019 | Chou .................... H02K 5/207 |

FOREIGN PATENT DOCUMENTS

| | | |
|---|---|---|
| CN | 201925304 U | 8/2011 |
| CN | 207080477 U | 3/2018 |
| DE | 102010051192 A1 | 5/2012 |
| DE | 102015210641 A1 | 12/2016 |
| EP | 2562102 A1 | 2/2013 |

OTHER PUBLICATIONS

International Preliminary Report on Patentability issued in corresponding International Application No. PCT/EP2020/025305 dated Jan. 11, 2022, pp. 1-7.

* cited by examiner

CONVEYOR HAVING AN ELECTRIC MOTOR

CROSS-REFERENCE TO RELATED APPLICATIONS

The present application claims the benefit of U.S. Provisional Application No. 62/872,931, filed on Jul. 11, 2019, which is expressly incorporated herein in its entirety by reference thereto.

FIELD OF THE INVENTION

The present invention relates to a conveyor having an electric motor.

BACKGROUND INFORMATION

In certain conventional systems, conveyor belts are driven by geared motors.

German Patent Document No. 10 2015 210 641 describes an electric motor.

U.S. Patent Application Publication No. 2004/0035684 describes a roller conveyor is known.

German Patent Document No. 10 2010 051 192 describes A1 is a production method for a conveyor, the conveyor having a toothed wheel which is connected in a torsionally fixed manner on a shaft and whose tooth system meshes with the tooth system of another toothed wheel so that conveyable goods are conveyed between a first channel region and a second channel region.

SUMMARY

Example embodiments of the present invention provide a conveyor with the goal of allowing for an economical operation.

According to an example embodiment of the present invention, in a conveyor having an electric motor, the electric motor has a stator housing and a rotor, and the rotor is connected in a torsionally fixed manner to a hollow shaft, which is rotatably mounted relative to the stator housing. For example, the hollow shaft is mounted with the aid of a first bearing, which is accommodated in a bearing flange and connected to the stator housing, and with the aid of a second bearing, which is accommodated in a second bearing flange and connected to the stator housing on the side of the stator housing facing away from the first bearing flange. The hollow shaft is connected in a torsionally fixed and, particularly, a force-locked manner to a solid shaft, which at least partly projects into a recess of the hollow shaft, and the stator housing, e.g., the first bearing flange connected to the stator housing, is connected to a flange which is connected to a second support part on the side facing away from the electric motor. The solid shaft projects through a recess of the second support part and is rotatably mounted in a first bearing accommodated in a first support part, and the solid shaft is connected to a conveyor device, e.g., a roller or toothed wheel, in a torsionally fixed manner. The conveyor device is situated between the first and the second support part, and the flange is connected to the second support part with the aid of screw parts projecting through recesses of the flange, e.g., with the aid of threaded rods projecting through recesses of the flange, or with the aid of screws having screw heads projecting through recesses of the flange. Each screw part is set apart from the flange, and the respective screw part projects through a respective spring part situated between the screw part and the flange in each case, and the respective spring part, for example, being inserted into a recess that extends axially through the flange.

This offers the advantage that the electric motor is able to be installed directly on the support part and is retained by the support part. The hollow shaft is therefore directly connectable to the solid shaft of the conveyor to be driven, or in other words, is connectable without an interposed gear unit. This makes it possible to dispense with a gear unit so that a cost-effective operation of the conveyor is possible, especially with low energy losses.

However, in order to generate sufficient torque, the electric motor must be arranged as a synchronous motor. The startup moment of a conveyor is high because the solid shaft drives a belt via a roller or drives a conveyor chain via a toothed wheel and both the belt and the chain are under tension. High frictional forces are induced as a result, which means that the motor must generate a high startup moment.

Because of the direct installation of the electric motor via the flange on the second support part, heat can also be dissipated to the support part.

The spring parts make it possible for the flange to be connected to the second support part once the solid shaft is connected to the hollow shaft, thereby allowing for an alignment of the flange with respect to the axis of rotation. Thus, if the axis of rotation of the hollow shaft has moved slightly, the flange is movable as well, although the spring parts generate an increasing counterforce if the movement is excessive. This allows for a movement of the flange but also for a restoring action of force if the movement is excessive. In contrast to an arrangement without the spring parts, the spring parts therefore ensure that a certain residual tension remains in the system in case of deviations between the axis of rotation of the solid shaft and/or the hollow shaft and their respective ideal positions due to production tolerances and thereby prevents play. For instance, this residual tension is also applied to the bearings, and the parts of the system are elastically deflected. In total, this involves a small residual tension which is therefore absorbable by the system. The flange thus is, for example, made from a softer material than the second support part. In this manner way, the flange itself also absorbs a portion of the residual tension.

Because of the residual tension of the system, mechanical vibrations that occur during the operation thus also induce lower amplitudes.

According to example embodiments, a second bearing for the rotatable support of the solid shaft is situated in the first support part. This has the advantage that the solid shaft is mountable on both sides. This is because it is mounted in a second bearing on the one side and via the hollow shaft in the bearings of the motor on the other side.

According to example embodiments, the spring part is produced from an elastic material, e.g., an elastomer and/or rubber, and/or has an annular configuration. For example, the spring part has a radially projecting collar which circumferentially surrounds the ring axis of the annular spring part in the circumferential direction, the collar, e.g., restricting the spring part in the axial direction at the flange. This is considered advantageous insofar as the restoring force is only low so that possibly existing play in the system is overcome yet no high tension load is introduced into the system.

According to example embodiments, the flange is produced in an integral fashion and/or as one part from a material whose modulus of elasticity is greater than the modulus of elasticity of the second support part. This has the advantage that a portion of the residual tension is absorbable in the flange, especially through an elastic deformation.

According to example embodiments, the hollow shaft has a centrically situated recess, which is arranged in the manner of a blind hole, or it has a bore that axially passes through the hollow shaft. This is considered advantageous insofar as the solid shaft may be inserted into the hollow shaft and a clamping ring is slipped over the hollow shaft, which shrinks the hollow shaft onto the solid shaft when a clamping screw of the clamping ring is operated.

According to example embodiments, the region covered by the hollow shaft in the axial direction includes the region covered by the stator housing, for example, such that the hollow shaft projects from the stator housing on both sides in the axial direction and counter to the axial direction. This offers the advantage that the hollow shaft projects from both sides so that a sufficiently long axial connection region is available for the solid shaft.

According to example embodiments, the second support part is produced from steel, and the flange is made of aluminum. This has the advantage that the residual tension can at least partially be absorbed in the flange.

According to example embodiments, the recesses extending axially through the flange part to accommodate the spring parts form a square base pattern, e.g., when viewed in the axial direction. This has the advantage that the corner regions of the flange are able to be utilized.

According to example embodiments, the flange is arranged as a truncated pyramid having a square base area, and a spring part, for example, is situated in a respective corner region of the square in each case. This offers the advantage that the spring parts are positioned at a great radial distance and the flange thus is deformed only slightly when absorbing the residual tension.

According to example embodiments, the perpendicular projection of the spring parts onto a plane whose normal direction is aligned in parallel with the axis of rotation of the hollow shaft of the electric motor is set apart from the perpendicular projection of the stator housing onto this plane. This offers the advantage that the screw parts passed through the spring parts are freely able to be operated from the stator housing. This is because the spatial regions covered by the spring parts radially project beyond the spatial region covered by the stator housing.

According to example embodiments, a power converter is connected to the stator housing, and the perpendicular projection of the spring parts onto a plane whose normal direction is aligned in parallel with the axis of rotation of the hollow shaft of the electric motor is set apart from the perpendicular projection of the power converter onto this plane. This has the advantage that the screw parts passed through the spring parts are able to be freely operated from the converter. This is because the spatial regions covered by the spring parts project radially beyond the spatial region covered by the power converter.

According to example embodiments, cooling fins are premolded on the flange. This has the advantage that the heat flowing from the electric motor to the second support part is already able to be at least partially dissipated to the environment via the cooling fins while flowing through the flange.

The cooling fins, for example, extend in the axial direction and are set apart from one another at regular intervals in the circumferential direction in relation to the axis of rotation of the solid shaft; however, no cooling fins are situated in the circumferential angle region covered by the respective spring part, especially by its collar, but in the region covered by the cooling fins in the axial direction, the radial distance region covered by the flange is smaller than and/or set apart from the radial distance region covered by the spring parts. Thus, a spatial region that may be used for operating the screw parts is kept free of cooling fins.

Further features and aspects of example embodiments of the present invention are described in greater detail below with reference to the appended schematic Figures.

DETAILED DESCRIPTION

Figure 1:
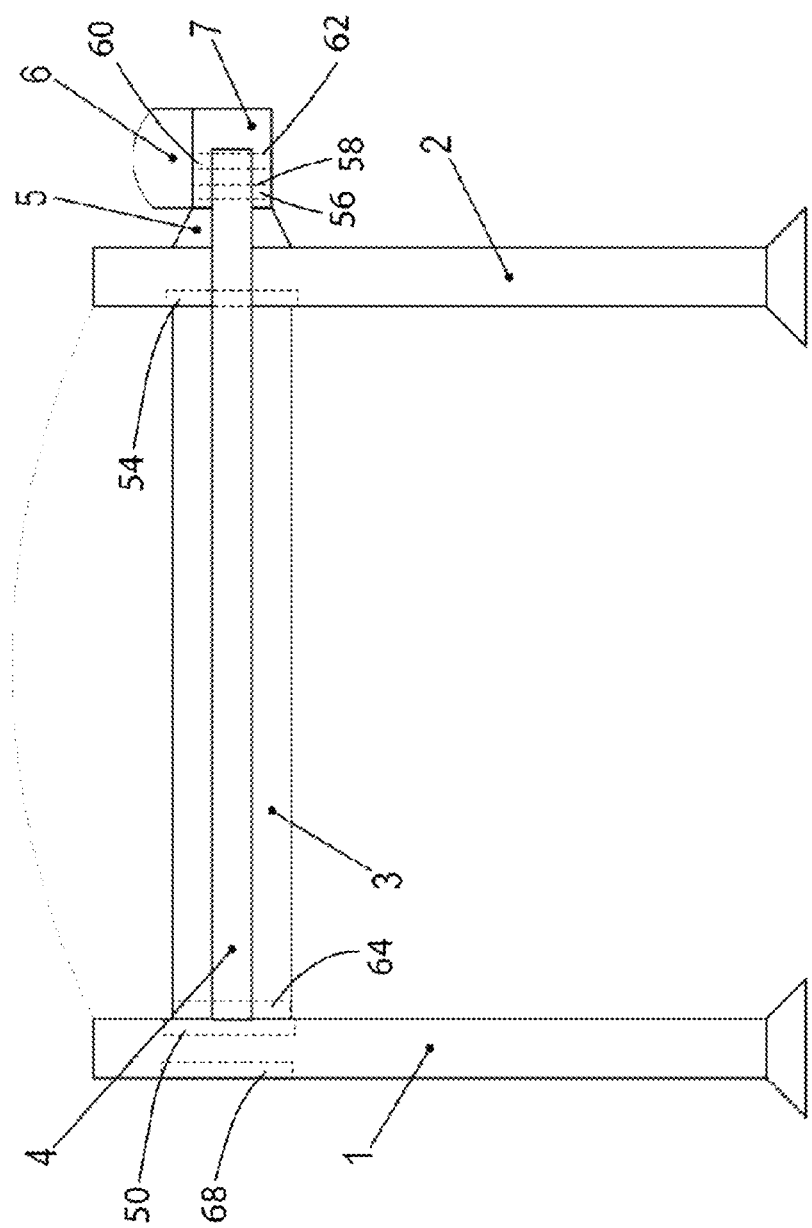
FIG. 1 schematically illustrates a conveyor according to an example embodiment of the present invention, e.g., a band conveyor or conveyor belt, which has a directly driving electric motor.

As illustrated in the figures, the conveyor has a solid shaft 4 which is rotatably mounted in a first support part 1 via a bearing 50, 68, e.g., a roller bearing.

A second bearing 54 for the rotatable mounting of solid shaft 4 is also situated in a second support part 2, which is set apart from first support part 1, the solid shaft 4 projecting from both sides of this second bearing.

The electric motor is positioned on the side of second support part 2 facing away from first support part 1.

For this purpose, flange 5 of the electric motor is connected to the second support part 2 with the aid of screws.

On the side facing away from second support part 2, a stator housing 7 of the electric motor is connected to flange 5 with the aid of screws.

Figure 2:
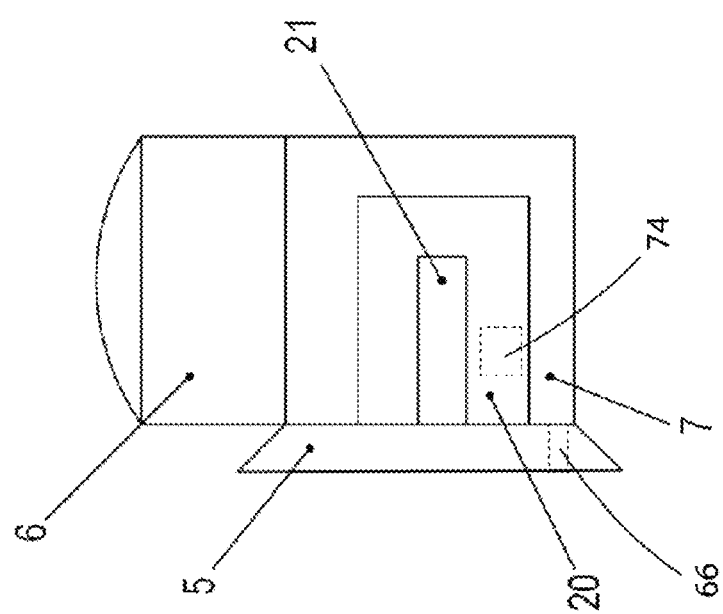
FIG. 2 is a schematic longitudinal cross-sectional view of the electric motor.

A rotor 20 is situated on a hollow shaft 21 in a torsionally fixed manner and connected to it. For example, the rotor 20 of the electric motor includes permanent magnets 74 and/or the electric motor is arranged as a synchronous motor, as illustrated, e.g., in FIG. 2.

Hollow shaft 21 is rotatably mounted via two bearings 56, 60 of the electric motor accommodated in stator housing 7, e.g., in two bearing flanges 58, 62 connected to stator housing 7.

Hollow shaft 21 is connected to solid shaft 4 in a torsionally fixed manner, e.g., by force locking with the aid of a shrink screw.

When the electric motor provided with flange 5 is installed on second support part 2, screw parts 52 are used such as connection screws or threaded bolts with screw nuts. For example, the screw parts 52 include threaded rods 66.

Flange 5 has axially uninterrupted recesses through which the screw parts project. However, a spring part 30 having an annular configuration is situated in the recess in each case. The screw part is guided through a respective spring part 30.

Thus, the screw parts have no direct contact with flange 5. A spring part 30 thus is situated between each screw part.

Spring parts 30 are, for example, arranged as rubber bushings.

When the electric motor provided with flange 5 is installed on second support part 2, spring parts 30 center the electric motor because the coaxial alignment of solid shaft 4 relative to hollow shaft 21 is important. First, solid shaft 4 thus is connected to hollow shaft 21 and only then will the screw parts be tightened with the aid of nuts. Spring parts 30 are therefore already deformed prior to this tightening of the screws to compensate for tolerances.

Spring parts 30, for example, have a circumferential collar 70 in one of their axial end regions so that they are able to be inserted into the axial bore holes only until the respective collar makes contact. The individual collar therefore restricts the axial insertion.

A power converter 6 is connected to stator housing 7 so that the power converter is able to operate the electric motor in a manner controlled on the basis of the rotational speed or the rotation moment.

A roller 3 and/or a toothed wheel 64 is connected to solid shaft 4 between the two support parts 1 and 2 in a torsionally fixed manner. Roller 3, for example, drives a band or a belt.

The radial distance region covered by flange 5 encompasses the radial distance region included by roller 3. It, for example, has a greater radial extension such that the screw parts may be connected radially outside roller 3.

The axial direction is aligned in parallel with the axis of rotation of solid shaft 4.

Hollow shaft 21 is provided with a cavity arranged in the manner of a blind hole. This means that the cavity of hollow shaft 21 has no uninterrupted configuration but has the form of a blind hole. At its end region facing away from flange 5, hollow shaft 21 thus has a solid shaft region which seals the adjoining hollow shaft region. A better protection type is thereby achievable because no fluid from the cavity can enter the interior space of the motor. In addition, an axial restriction is achieved for solid shaft 4 inserted into the hollow shaft region.

As illustrated in FIG. 1, the lateral extension of flange 5 is also greater than the extension of power converter 6 in this direction. This makes it possible to guide the screw parts through the uninterrupted recesses of spring parts 30 and thus also through the axial bores of flange 5 that accommodate spring parts 30. The screw parts are thus able to be operated from power converter 6 without interference or obstacles. The perpendicular projection of spring parts 30 onto a plane whose normal direction is aligned in parallel with the axis of rotation of hollow shaft 21 of the electric motor is set apart from the perpendicular projection of the power converter onto this plane, and especially also from the perpendicular projection of the stator housing onto this plane.

Flange 5 is, for example, made from a material that is softer, i.e., has a greater modulus of elasticity, than the material of second support part 2, and is harder, i.e., has a lower modulus of elasticity, than spring parts 30. In addition, the material, for example, has a greater thermal conductivity than steel. The heat flowing from stator housing 7 into flange 5 is therefore able to spread out in flange 5 and can be conducted to second support part 2, which may thus also be produced from steel. This is because even a poorer thermal conductor is able to absorb the fanned-out heat flow to a sufficient degree and conduct it into the environment.

Flange 5, for example, has cooling fins 72 on its outer side, which extend in the axial direction.

Hollow shaft 21 is guided axially through the center of the flange and thus projects axially from both sides.

Flange 5 has the shape of a pyramid featuring a square base area.

Figure 3:
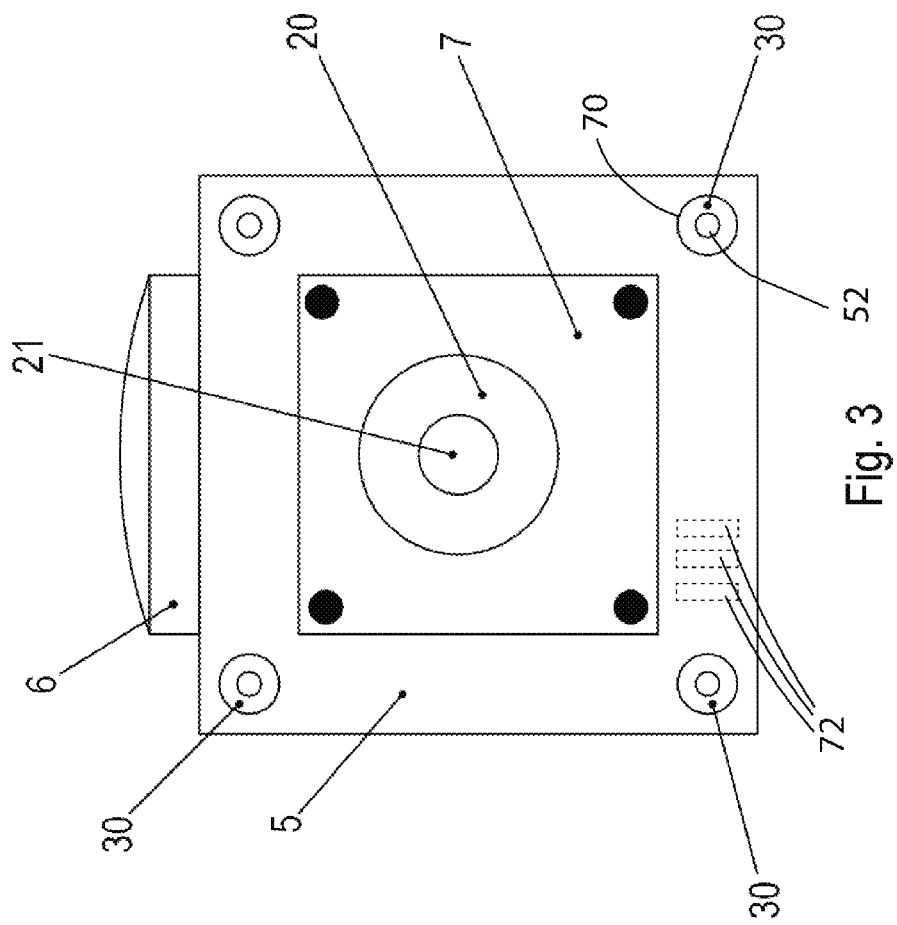
FIG. 3 is a schematic top view of the electric motor.

As illustrated in FIG. 3, the outer circumference of the perpendicular projection of flange 5 into a plane whose normal is aligned in parallel with the axial direction, i.e., in parallel with the axis of rotation of hollow shaft 21, is a square.

In further exemplary embodiments, an axially uninterrupted cavity is used instead of the cavity of the type of a blind hole. As a result, hollow shaft 21 has an axially uninterrupted cylindrical cavity, the hollow shaft, for example, being arranged as a hollow cylinder. This allows for a cost-effective configuration in which the insertion depth of solid shaft 4 is not specified.

In further exemplary embodiments, the axial end of hollow shaft 21 is not situated in the axial region covered by rotor 20 but the axial region covered by hollow shaft 21 even includes the entire axial region covered by rotor 20. For example, the hollow shaft projects from the electric motor, e.g., from its stator housing 7, on the B-side and the A-side.

Via the flange, heat from the stator housing is also able to be dissipated to second support part 2. Better cooling of the motor is achievable as a result.

In further exemplary embodiments, the bearing accommodated in second support part 2, i.e., the second bearing, is not provided; instead, the bearings of hollow shaft 21 situated in the electric motor also assume the mounting of solid shaft 4 once solid shaft 4 has been connected to hollow shaft 21. As a result, solid shaft 4 is mounted only via the first bearing, which is accommodated in first support part 1, and via the bearings accommodated in stator housing 7. Losses are therefore able to be reduced and especially the heat input into second support part 2.

The invention claimed is:

1. A system, comprising:
    an electric motor including a stator housing and a rotor, the rotor being connected in a torsionally fixed manner to a hollow shaft that is rotatably mounted relative to the stator housing, the hollow shaft being connected in a torsionally fixed and a force-locked manner to a solid shaft that at least partly projects into a recess of the hollow shaft;
    wherein the stator housing is connected to a flange that is connected to a second support part on a side facing away from the electric motor;
    wherein the solid shaft projects through a recess of the second support part and is rotatably mounted in a first bearing accommodated in a first support part;
    wherein the solid shaft is connected to a conveyor device in a torsionally fixed manner, the conveyor device being arranged between the first support part and the second support part;
    wherein the flange is connected to the second support part with the aid of screw parts projecting through recesses of the flange and/or with the aid of screws having screw heads projecting through recesses of the flange, each screw part being set apart from the flange, and each respective screw part projecting through a respective spring part that is arranged between the screw part and the flange,
    each respective spring part being arranged in a recess that extends axially through the flange; and
    wherein the flange is arranged as a truncated pyramid having a square base area.

2. The system according to claim 1, wherein the hollow shaft is mounted with the aid of the first bearing accommodated in a first bearing flange and connected to the stator housing and with the aid of a second bearing accommodated in a second bearing flange and connected to the stator housing on a side of the stator housing facing away from the first bearing flange.

3. The system according to claim 2, wherein the first bearing flange, which is connected to the stator housing, is connected to the flange that is connected to the second support part on the side facing away from the electric motor.

4. The system according to claim 1, wherein the conveyor device includes a roller and/or a toothed wheel.

5. The system according to claim 1, wherein the screw parts include threaded rods.

6. The system according to claim 1, wherein a second bearing adapted to rotatably mounting the solid shaft is arranged in the first support part.

7. The system according to claim 1, wherein the spring part is formed from an elastic material, an elastomer, and/or rubber and/or has an annular configuration.

8. The system according to claim 1, wherein the spring part includes a radially projecting collar that surrounds a ring axis of the spring part, having an annular configuration, in a circumferential direction, the collar projecting radially on the spring part.

9. The system according to claim 8, wherein the collar restricts the spring part in an axial direction at the flange.

10. The system according to claim 1, wherein the flange is arranged as an integral part and/or as one part from a material having a modulus of elasticity that is greater than a modulus of elasticity of the second support part.

11. The system according to claim 1, wherein the hollow shaft includes a centrically arranged recess, arranged as a blind hole, and/or a bore that axially passes through the hollow shaft.

12. The system according to claim 1, wherein a region covered by the hollow shaft in an axial direction includes a region covered by the stator housing, the hollow shaft projecting from the stator housing on both sides in the axial direction and counter to the axial direction.

13. The system according to claim 1, wherein the second support part is formed of steel, and the flange is formed of aluminum.

14. The system according to claim 1, wherein the recesses extending axially through the flange part to accommodate the spring parts form a square bore pattern, viewed in an axial direction.

15. A system, comprising:
an electric motor including a stator housing and a rotor, the rotor being connected in a torsionally fixed manner to a hollow shaft that is rotatably mounted relative to the stator housing, the hollow shaft being connected in a torsionally fixed and a force-locked manner to a solid shaft that at least partly projects into a recess of the hollow shaft;
wherein the stator housing is connected to a flange that is connected to a second support part on a side facing away from the electric motor;
wherein the solid shaft projects through a recess of the second support part and is rotatably mounted in a first bearing accommodated in a first support part;
wherein the solid shaft is connected to a conveyor device in a torsionally fixed manner, the conveyor device being arranged between the first support part and the second support part;
wherein the flange is connected to the second support part with the aid of screw parts projecting through recesses of the flange and/or with the aid of screws having screw heads projecting through recesses of the flange, each screw part being set apart from the flange, and each respective screw part projecting through a respective spring part that is arranged between the screw part and the flange, each respective spring part being arranged in a recess that extends axially through the flange; and
wherein the flange is arranged as a truncated pyramid having a square base area, a respective spring part being arranged in a corner region of the square base area.

16. The system according to claim 1, wherein a perpendicular projection of the spring parts onto a plane whose normal direction is aligned in parallel with an axis of rotation of the hollow shaft of the electric motor is set apart from a perpendicular projection of the stator housing onto the plane.

17. The system according to claim 1, wherein a power converter is connected to the stator housing, and a perpendicular projection of the spring parts onto a plane whose normal direction is aligned in parallel with an axis of rotation of the hollow shaft of the electric motor is set apart from a perpendicular projection of the power converter onto the plane.

18. The system according to claim 1, wherein cooling fins are premolded on the flange.

19. The system according to claim 1, wherein the rotor of the electric motor includes permanent magnets and/or the electric motor is arranged as a synchronous motor.

20. The system according to claim 1, wherein cooling fins of the flange extend in an axial direction and are set apart from one another at regular intervals in a circumferential direction in relation to an axis of rotation of the solid shaft.

21. The system according to claim 20, wherein no cooling fins are arranged in a circumferential angle region covered by a respective spring part and/or a collar of the respective spring part, in a region covered by the cooling fins in an axial direction, a radial distance region covered by the flange is smaller than and/or set apart from a radial distance region covered by the spring parts.

22. A system, comprising:
an electric motor including a stator housing and a rotor, the rotor being connected in a torsionally fixed manner to a hollow shaft that is rotatably mounted relative to the stator housing, the hollow shaft being connected in a torsionally fixed manner to a solid shaft that projects at least partly into a recess of the hollow shaft;
wherein the stator housing is connected to a flange that is connected to a second support part on a side facing away from the electric motor;
wherein the solid shaft projects through a recess of the second support part and is rotatably mounted in a first bearing accommodated in a first support part;
wherein the solid shaft is connected to a conveyor device in a torsionally fixed manner, the conveyor device being arranged between the first and the second support part;
wherein the flange is connected to the second support part with the aid of screw parts projecting through recesses of the flange, each screw part being set apart from the flange and the respective screw part projects through a spring part that is arranged between the respective screw part and the flange;
wherein a region covered by the hollow shaft in an axial direction includes a region covered by the stator housing; and
wherein the flange is arranged as a truncated pyramid having a square base area.

23. The system according to claim 22, wherein a respective spring part is arranged in a corner region of the square base area.

* * * * *